No. 667,739. Patented Feb. 12, 1901.
C. SCHIERBAUM.
DRESSMAKER'S RULE.
(Application filed Oct. 5, 1900.)
(No Model.)

Inventor:—
Clara Schierbaum
by Arthur H. Harrison
her Attorney.

Witnesses:
Horace G. Deitz
H. Josepha Doyle

THE NORRIS PETERS CO., PHOTO-LITHO., WASHINGTON, D. C.

UNITED STATES PATENT OFFICE.

CLARA SCHIERBAUM, OF CLEVELAND, OHIO.

DRESSMAKER'S RULE.

SPECIFICATION forming part of Letters Patent No. 667,739, dated February 12, 1901.

Application filed October 5, 1900. Serial No. 32,122. (No model.)

*To all whom it may concern:*

Be it known that I, CLARA SCHIERBAUM, of Cleveland, in the county of Cuyahoga and State of Ohio, have invented new and useful Improvements in Dressmakers' Rules; and I do hereby declare the following to be a full, clear, and exact description of said invention, reference being had to the accompanying drawings, and to the letters or figures of reference marked thereon, which form a part of this specification.

My invention relates to measuring-rules, and has particular reference to rules designed for dressmakers' use in taking measurements of the human figure and transferring them to the pattern-sheet.

The object of my invention is to provide a rule of this character having certain divisions, numerals, initials, and other markings which will enable a dressmaker to conveniently use different parts of the rule for taking measurements of particular parts of the body of the person to be fitted.

To these ends my invention consists in the rule substantially as hereinafter described, and pointed out in the claims.

Figure 1:
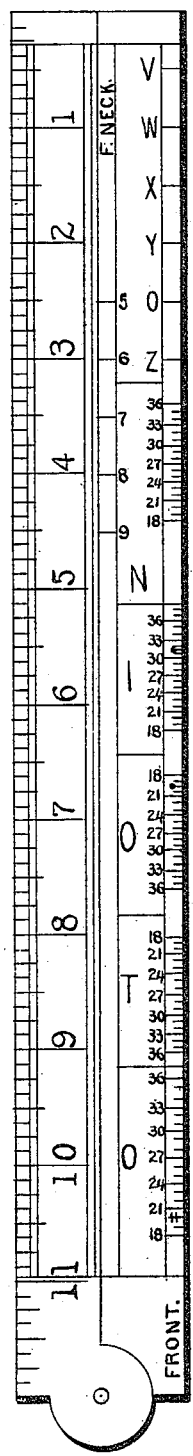
Figure 2:
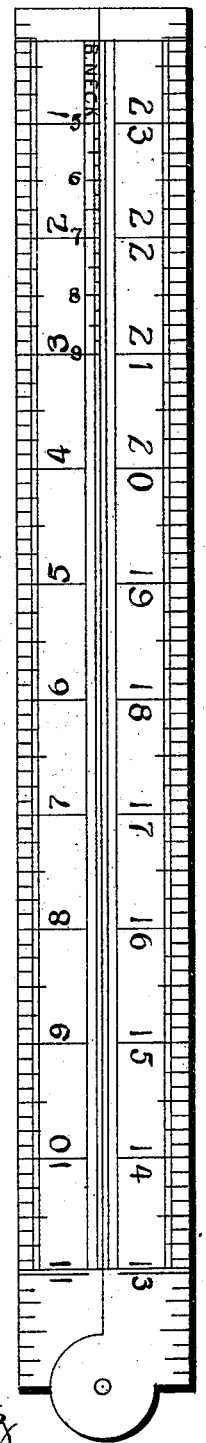

In the accompanying drawings, Figure 1 is a slightly-reduced representation of one side of a rule embodying my invention. Fig. 2 is a similar representation of the other side of the rule shown in Fig. 1.

While I have shown the rule as of the ordinary jointed type, it is to be understood that it may be a single unjointed strip or piece of wood or other material, and it may be made of either rigid or flexible material. Preferably the total length of the rule is a correct "two-foot" rule, having markings on one side to represent inches from "1" to "24" and fractions thereof.

Referring first to Fig. 2, it will be seen that the first three inches are marked with the numerals "5," "6," "7," "8," and "9," half an inch apart, the numeral "5" being on the line indicating one inch from the end and the numeral "9" being on the line marking the end of the third inch. These three inches of the rule on this side have fractional division-lines at each edge, and along one edge is imprinted the designation "B. neck." These markings are to be used for taking back-neck measures. The other side of the rule represented in Fig. 1 is more extensively marked. Half of the rule, however, carries no markings other than the inch-marks "1" to "12" and their fractions. The other half of the rule (shown on the right of Fig. 1) carries near one end the designation "F. neck," and a space slightly exceeding three inches carries edge markings designated by the characters "V," "W," "X," "Y," "O," and "Z." These are employed for drafting different parts of the garment, it being unnecessary, however, to herein mention the particular use of each marking. Proceeding beyond this succession of characters, the rule is divided into a series of uneven groups designated by the characters "N," "I," "O," "T," and "O," and below the last character and near the middle of the rule (the joint in the embodiment shown) is the word "Front." The groups of figures designated "N," "I," "O," and "T" are used in taking waist-measures. In the group "I" is a dot, and in the adjoining group "O" is another dot, these two dots being used in connection with the drafting of the darts of the waist in connection with the numerals in said group, the dot being placed on the corner or meeting of the waist and back line and the measurements taken therefrom. In the group "O" located nearest the middle or the joint of the rule there are two marks crossing one of the measuring-lines and having the appearance of an "-+|+-." This also
is used for taking the measurements of a dart. The edge of each section "N," "I," "O," "T," and "O" is marked with suitable divisions differing in their measurements and carrying numerals "18," "21," "24," "27," "30," "33," and "36." These are employed for obtaining fractional measurements of the dimensions for which said groups are employed. In the group "N" and extending over into the space toward the outer end of the rule are divisions marked "5," "6," "7," "8," and "9," which are used for taking the front-neck measures. These markings are on the same edge of the rule that carries the designation "F. neck." The lower group "O" of measurements, the group nearest the middle or joint of the rule, are employed for the drafting of darts.

It is to be understood that the actual measurements between the desired points of the body of the person to be fitted are made with the usual flexible measure or tape-line. The rule herein shown, described, and claimed is used in drafting on the cloth or on paper patterns the lines on which the cloth or paper is to be cut and for indicating the length of said lines. In practice I also use in connection with this rule during the drafting flexible strips or pieces of metal or other suitable material having straight and curved edges, which strips need not be specifically described herein.

Having thus described my invention, what I claim is—

1. A dressmaker's rule having groups of measuring-lines indicated by proper numerals, the said groups being distinguished from each other by characters "N" "I" "O" "T" and "O," and another group bearing the characters "V" "W" "X" "Y" "O" and "Z," the last-mentioned group carrying the designation "F. neck," and the groups "I" and "O" of the markings indicated by numerals having each of them a dot, substantially as and for the purpose set forth.

2. A dressmaker's rule having groups of measuring-lines indicated by proper numerals, the said groups being distinguished from each other by characters "N" "I" "O" "T" and "O," and another group bearing the characters "V" "W" "X" "Y" "O" and "Z," the last-mentioned group carrying the designation "F. neck," and the groups "I" and "O" of the markings indicated by numerals having each of them a dot, one edge of the rule along the space occupied by the group "N" and by the adjacent marks "O" "Z" having marks designated by the numerals "5" "6" "7" "8" and "9," the opposite side of the rule having the designation "B. neck" and a group of markings designated by the numerals "5" "6" "7" "8" and "9," substantially as and for the purpose set forth.

In testimony whereof I affix my signature in presence of two witnesses.

CLARA SCHIERBAUM.

Witnesses:
 HENRIETTE STOLF,
 ARTHUR STOLF.